May 15, 1928.

E. H. HOBBIE

SHEET GLASS

Filed April 4, 1924

1,669,663

INVENTOR
Edward H. Hobbie
BY
Cooper, Kerr & Dunham
HIS ATTORNEYS

Patented May 15, 1928.

1,669,663

UNITED STATES PATENT OFFICE.

EDWARD H. HOBBIE, OF BOONTON, NEW JERSEY, ASSIGNOR TO MISSISSIPPI GLASS COMPANY, OF NEW YORK, N. Y., A CORPORATION OF NEW YORK.

SHEET GLASS.

Application filed April 4, 1924. Serial No. 704,204.

The present invention relates to improvements in sheet glass useful in the arts generally, and particularly as window glass in the walls of houses, factories, office partitions, doors, and the like.

I have discovered that when sheet glass having a figured surface comprising two series of parallel lines extending diagonally across the sheet, one series at an angle with the other, from the top to the bottom is utilized as a window pane in a wall, door, or partition of a building structure that it has the property of deflecting light passing therethrough, one half going to the working plane and the other half going to the ceiling which is a good reflector of light and whereupon said other half of the light is reflected downward toward the working plane, and I am therefore able to utilize in and distribute throughout a room substantially all the light passing through the window pane with a consequent reduction to a minimum of shadows therein.

I have further discovered that by making the design in the form of intersecting diagonal grooves with plane faces that the glass is easily cleaned.

The diffusion of light passing through such a pattern also results in the obstruction of vision therethrough which is often a desirable feature in the windows of offices, factories, etc.

The arrangement of the intersecting parallel grooves and the unobstructed parallel prisms formed thereby on the figured surface of the sheet glass will be clear by reference to the accompanying drawing, in which Fig. 1 is a plan view of a sheet of glass embodying my improvement.

Figure 1:
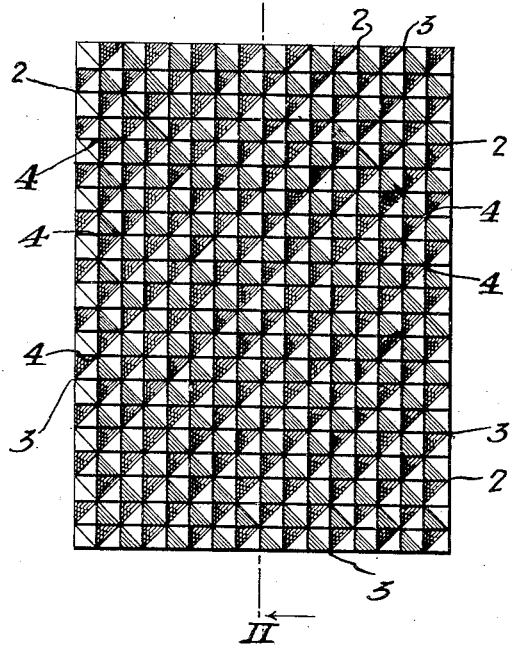
Figure 2:
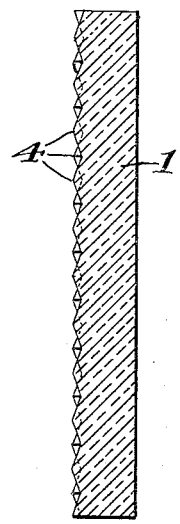
Fig. 2 is a sectional view through line II—II of Fig. 1.
Figure 3:
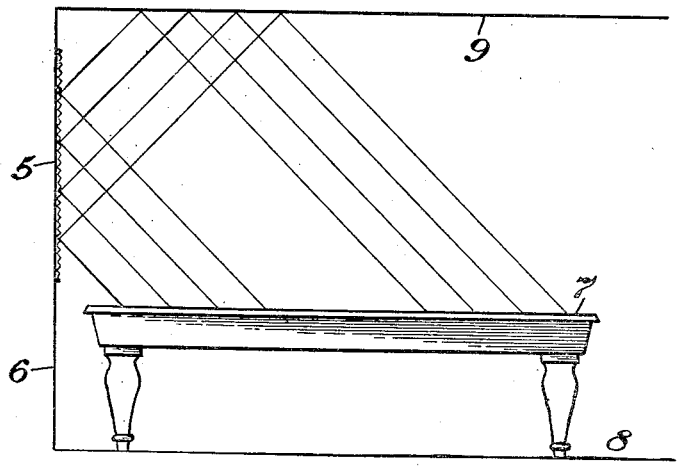
Fig. 3 is a diagrammatic representation of a room with a window of glass embodying my invention and showing the deflection of light by said window.

As shown in Figs. 1 and 2, a sheet of glass 1 is provided with a figured surface comprising two series of parallel V-shaped grooves 2—2 and 3—3 running diagonally across the sheet 1 from top to bottom, or vice-versa, the grooves of one series intersecting those of the other series, and forming parallel rows of prisms 4—4, which are availed of to deflect the light passing through sheet 1, which is window 5, in wall 6 of Fig. 3, and indicated by line 11—11 in said Figure 1, one half being directed downward to the working planes of a room, table 7 and floor 8, for example, and the other half being deflected upwardly to the ceiling 9, which in turn reflects the light downwardly, as is now well understood in the art. The shadows, due to side deflection or transmission being reduced to a minimum, an even diffusion and distribution of the light passing through window 5 is obtained in the room.

What I claim as my invention is:

1. A sheet of glass for distributing rays of light passing therethrough in such directions that substantially all rays of light passing through the sheet of glass are directed so as to have a vertical component of direction when the sheet of glass is placed in a vertical plane, said sheet of glass having a plain surface through which rays of light pass when entering the sheet of glass, and a figured surface having a multiplicity of pyramid configurations produced by intersecting grooves and imaginary ridges defining triangular planes and vertices respectively of the pyramid configurations, all of said grooves and imaginary ridges running obliquely to at least one edge of the sheet of glass whereby the side intersections of the triangular planes of the pyramid configurations lie in planes perpendicular to at least one edge of the sheet of glass.

2. A sheet of glass for distributing rays of light passing therethrough in such directions that substantially all rays of light passing through the sheet of glass are directed so as to have a vertical component of direction when the sheet of glass is placed in a vertical plane, said sheet of glass having a plain surface through which rays of light pass when entering the sheet of glass, and a figured surface comprising pyramid configurations whose base lines run obliquely to the side edges of the sheet of glass, the side edges of the sheet of glass being disposed in vertical planes when rays of light passing through the sheet of glass are directed either upwardly or downwardly upon leaving the figured surface.

3. A sheet of glass marginally shaped to be mounted as a window in a side wall of a building, said sheet of glass having a plain surface through which rays of light pass when entering the sheet of glass, and a figured surface adapted to face the inner side of a building and comprising a plurality of intersecting planes, said planes sloping in respect to said plain surface and disposed in a plurality of series, the planes in each series being in parallel alinement and obliquely positioned in respect to an imaginary line running in a vertical plane from the upper limit to the lower limit of the side wall, the rays of light entering the plain surface of the sheet of glass from one side of the side wall being directed either upwardly or downwardly as they leave the figured surface of the sheet of glass at the other side of the side wall on the inner side of the building.

In testimony whereof I hereto affix my signature.

EDWARD H. HOBBIE.